(12) United States Patent
Zhu et al.

(10) Patent No.: US 11,271,486 B2
(45) Date of Patent: Mar. 8, 2022

(54) POWER SUPPLY DEVICE

(71) Applicant: Nanjing Chervon Industry Co., Ltd., Nanjing (CN)

(72) Inventors: Hong Zhu, Nanjing (CN); Zhijian Lu, Nanjing (CN); Qing Gao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 113 days.

(21) Appl. No.: 16/893,728

(22) Filed: Jun. 5, 2020

(65) Prior Publication Data

US 2020/0304032 A1 Sep. 24, 2020

Related U.S. Application Data

(63) Continuation of application No. PCT/CN2018/119373, filed on Dec. 5, 2018.

(30) Foreign Application Priority Data

Dec. 8, 2017 (CN) .......................... 201711294613.0
Dec. 8, 2017 (CN) .......................... 201711298235.3

(51) Int. Cl.
*H02M 3/335* (2006.01)
*H02J 7/00* (2006.01)

(52) U.S. Cl.
CPC ....... *H02M 3/33569* (2013.01); *H02J 7/0063* (2013.01)

(58) Field of Classification Search
None
See application file for complete search history.

(56) References Cited

U.S. PATENT DOCUMENTS

2015/0175021 A1* 6/2015 Kim ................... H02J 7/0013
                                                              320/109
2017/0047770 A1* 2/2017 Imperial ................. H02S 10/40
(Continued)

FOREIGN PATENT DOCUMENTS

CN             1326261 A      12/2001
CN          101922464 A      12/2010
(Continued)

OTHER PUBLICATIONS

ISA/CN, International Search Report issued on PCT application No. CN2018/119373, dated Mar. 12, 2019, 2 pages.

*Primary Examiner* — Jared Fureman
*Assistant Examiner* — Aqeel H Bukhari
(74) *Attorney, Agent, or Firm* — Greenberg Traurig, LLP

(57) ABSTRACT

A power supply device and a booster circuit for a power supply device. The booster circuit includes an access terminal configured to access a direct current voltage from a battery pack, a transformer group electrically connected to the access terminal so that the accessed direct current voltage is boosted to a predetermined voltage by the transformer group, and a rectifier bridge electrically connected to the transformer group to convert the predetermined voltage into a high-voltage direct current after pulse rectification. The transformer group includes a first transformer including a first primary side and a first secondary side and a second transformer including a second primary side and a second secondary side. The power supply device disclosed is compact in structure and convenient to carry and can output an alternating current.

20 Claims, 11 Drawing Sheets

(56) References Cited

U.S. PATENT DOCUMENTS

| | | | |
|---|---|---|---|
| 2017/0170740 A1 | 6/2017 | Choi | |
| 2017/0271892 A1* | 9/2017 | Cross | H02J 7/0042 |
| 2018/0159347 A1* | 6/2018 | Johnsen | B60L 50/30 |
| 2020/0161879 A1* | 5/2020 | Huff | H01M 50/20 |

FOREIGN PATENT DOCUMENTS

| | | |
|---|---|---|
| CN | 102739101 A | 10/2012 |
| CN | 203788155 U | 8/2014 |
| CN | 204131401 U | 1/2015 |
| CN | 105070975 A | 11/2015 |
| CN | 105359295 A | 2/2016 |
| CN | 106655369 A | 5/2017 |

\* cited by examiner

POWER SUPPLY DEVICE

RELATED APPLICATION INFORMATION

The present application claims the benefit of and is a continuation of International Application Number PCT/CN2018/119373, filed on Dec. 5, 2018, which application claims the benefit of Chinese Patent Application No. 201711294613.0, filed on Dec. 8, 2017, and Chinese Patent application number 201711298235.3, filed on Dec. 8, 2017, each of which is incorporated herein by reference in its entirety.

TECHNICAL FIELD

The present disclosure relates to a power supply device, in particular to a power supply device capable of providing an alternating current output.

BACKGROUND

With the development of battery technologies, power tools are gradually replacing engine tools. In order to achieve the working effect and battery life similar to those of the engine, the rated power and capacity of the battery pack are also increasing.

An alternating current power supply is usually needed to power some electric tools or facilities during working and traveling outdoors; traditional portable power supplies are often powered by battery cell groups inside the portable power supplies, and the alternating current cannot be continuously provided once the battery cell groups of the power supply run out of electrical energy.

SUMMARY

To solve the shortcomings in the existing art, an object of the present disclosure is to provide a power supply device capable of providing an alternating current output.

To achieve this and other objects, the present disclosure adopts the technical solutions described below.

In one example, a power supply device includes a housing; a plurality of battery pack ports, which are disposed on the housing to access a plurality of battery packs; a booster circuit, which is electrically connected to the plurality of battery pack ports to increase voltages of the plurality of battery packs to output a high-voltage direct current voltage; and an inverter circuit, which is electrically connected to the booster circuit to invert the high-voltage direct current voltage output by the booster circuit into an alternating current; where the booster circuit includes: a first transformer, including a first primary side and a first secondary side; and a second transformer, including a second primary side and a second secondary side; where a connection between the first primary side and the second primary side is one of a series connection or a parallel connection, and a connection between the first secondary side and the second secondary side is another one of the series connection or the parallel connection.

In a further example, the first primary side and the second primary side are connected in parallel, and the first secondary side and the second secondary side are connected in series.

In a further example, the booster circuit further includes: a power switch transistor, which is electrically connected to the first primary side or the second primary side to turn on one of the first primary side or the second primary side.

In a further example, the booster circuit further includes: a rectifier bridge, which is electrically connected to the first secondary side and the second secondary side separately so that the booster circuit outputs a first direct current voltage.

In a further example, power supply device further includes a controller, which is electrically connected to the power switch transistor and configured to control at a certain frequency the power switch transistor to be turned on or off at a certain frequency so that the first primary side and the second primary side oscillate to generate a primary pulse voltage.

In a further example, a value range of rated power of the power supply device is greater than or equal to 350 W.

In a further example, a booster circuit for a power supply device includes an access terminal, which is configured to access a direct current voltage from a battery pack; a transformer group, which is electrically connected to the access terminal so that the accessed direct current voltage is boosted to a predetermined voltage by the transformer group; and a rectifier bridge, which is electrically connected to the transformer group to convert the predetermined voltage into a high-voltage direct current after pulse rectification; where the transformer group includes: a first transformer, including a first primary side and a first secondary side; and a second transformer, including a second primary side and a second secondary side; where a connection between the first primary side and the second primary side is one of a series connection or a parallel connection, and a connection between the first secondary side and the second secondary side is another one of the series connection or the parallel connection.

In a further example, the first primary side and the second primary side are connected in parallel, and the first secondary side and the second secondary side are connected in series.

In a further example, the booster circuit for the power supply device further includes a power switch transistor, which is electrically connected to the first primary side or the second primary side to turn on one of the first primary side or the second primary side.

In a further example, the booster circuit for the power supply device further includes a power switch transistor, which is electrically connected to the first primary side or the second primary side; and a controller, which is electrically connected to the power switch transistor and configured to control at a certain frequency the power switch transistor to be turned on or off, so that the first primary side and the second primary side oscillate to generate a primary pulse voltage.

In a further example, the present disclosure provides a portable electrical energy system, including a battery pack, which is capable of powering at least one power tool; a first power supply device, which is configured for outputting electrical energy from the battery pack or inputting electrical energy to the battery pack; and a second power supply device, which is configured for outputting electrical energy from the battery pack or inputting electrical energy to the battery pack; where the first power supply device includes: a first inverter circuit, which is configured to convert a direct current input by the battery pack to an alternating current; and a first alternating current output interface, which is configured to enable the first power supply device to output a first alternating current voltage and electrically connected to the first inverter circuit; where the second power supply device includes: a second inverter circuit, which is configured to convert a direct current input by the battery pack to an alternating current; and a second alternating current output interface, which is configured to enable the second power supply device to output a second alternating current voltage and electrically connected to the second inverter circuit; and an alternating current connection device, which is configured for connecting the first alternating current output interface and the second alternating current output interface, so that the first alternating current voltage and the second alternating current voltage are connected in parallel.

In a further example, the first power supply device includes a plurality of first alternating current output interfaces.

In a further example, the second power supply device includes a plurality of second alternating current output interfaces.

In a further example, the alternating current connection device includes: a first alternating current connection terminal, which is electrically connected to the first alternating current output interface; and a second alternating current connection terminal, which is electrically connected to the second alternating current output interface.

In a further example, the alternating current connection device includes: an alternating current output terminal, which is configured to output a total voltage in which the first alternating current voltage and the second alternating current voltage are connected in parallel.

In a further example, the alternating current connection device includes: the first alternating current connection terminal, which is electrically connected to the first alternating current output interface; the second alternating current connection terminal, which is electrically connected to the second alternating current output interface; and an alternating current connection cable, which is electrically connected to the first alternating current connection terminal and the second alternating current connection terminal, separately; where the alternating current connection cable does not include an interconnection cable.

In a further example, the first power supply device includes at least two first alternating current output interfaces; where one of the two first alternating current output interfaces is electrically connected to the alternating current connection device, and another one of the first two alternating current output interfaces is configured for outputting a parallel voltage in which the first alternating current voltage and the second alternating current voltage are connected in parallel.

In a further example, the second power supply device includes at least two second alternating current output interfaces; where one of the two second alternating current output interfaces is electrically connected to the alternating current connection device, and another one of the two second alternating current output interfaces is configured for outputting a parallel voltage in which the first alternating current voltage and the second alternating current voltage are connected in parallel.

In a further example, the first power supply device further includes: a first battery pack interface, which is configured for the battery pack to be detachably connected to the second power supply device.

In a further example, the second power supply device further includes: a second battery pack interface, which is configured for the battery pack to be detachably connected to the second power supply device.

The present disclosure is beneficial in that: a power supply device is provided which can output an alternating current and which is compact in structure and convenient to carry.

DETAILED DESCRIPTION

The present disclosure will be specifically described below with reference to the drawings and specific examples.

Figure 1:
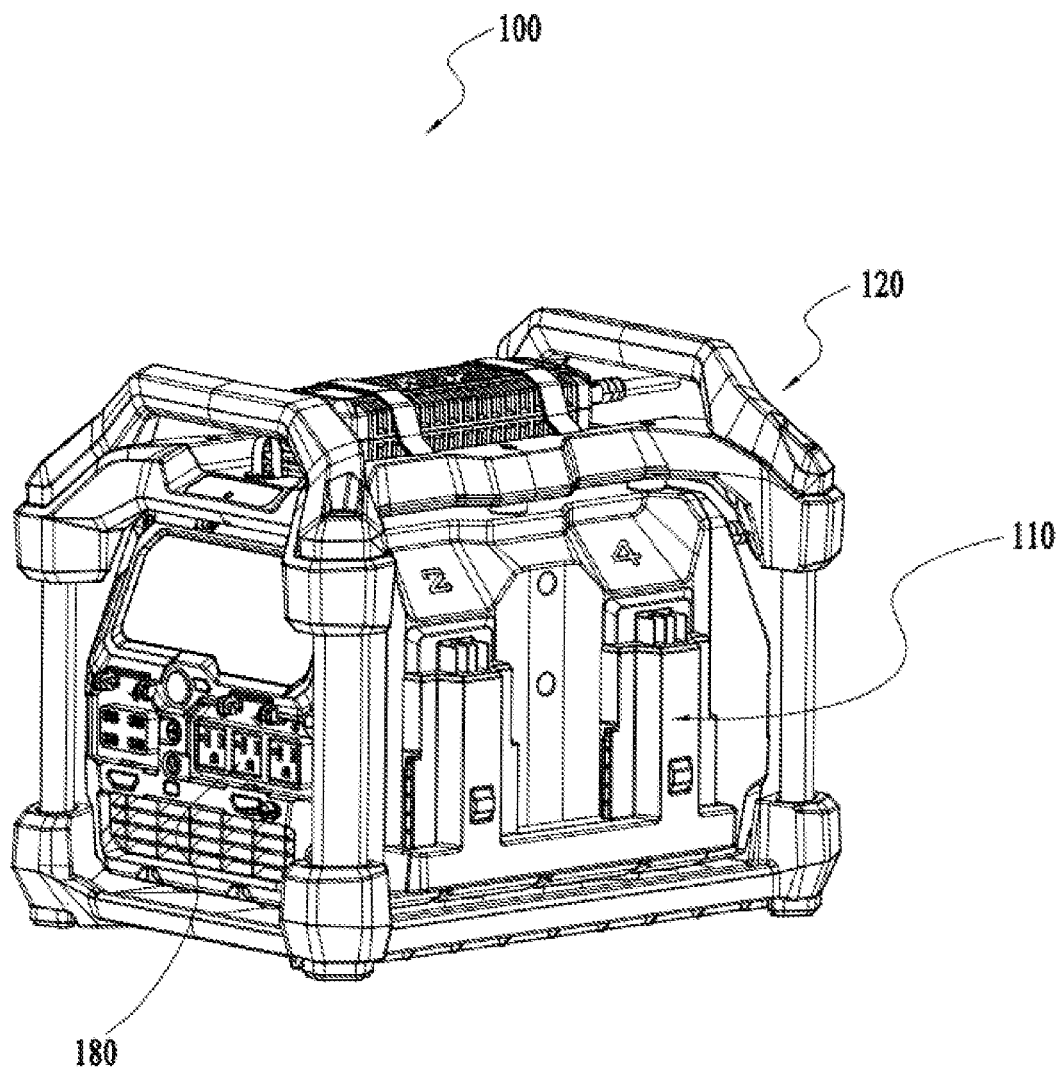
FIG. 1 is a structural view of a power supply device according to one example.
Figure 2:
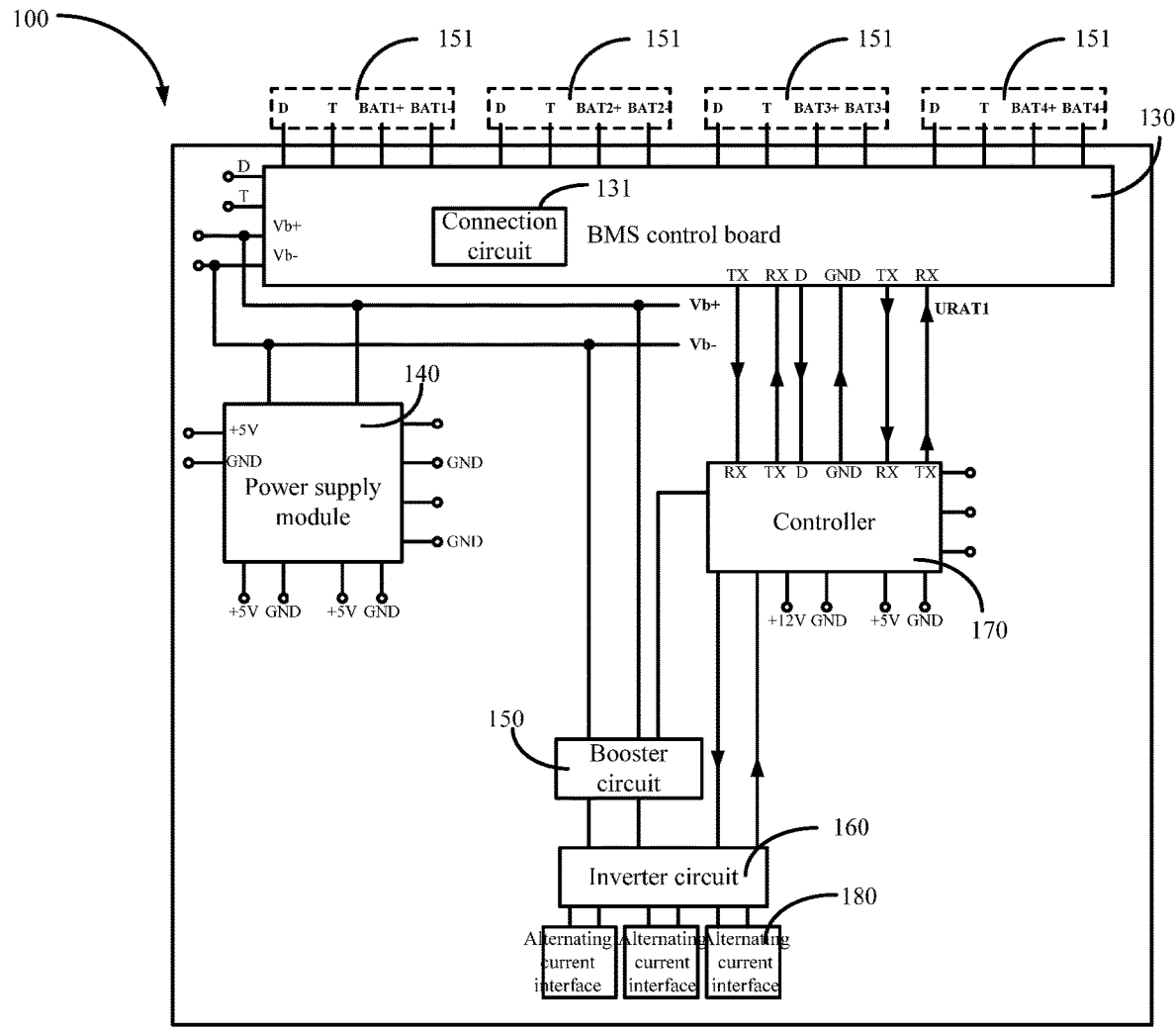
FIG. 2 is a system block diagram of the power supply device of FIG. 1.

Referring to FIGS. 1 and 2, a power supply device 100 includes a battery pack port 110 and a housing 120. The battery pack port 110 is disposed on the housing 120 of the power supply device 100 for receiving a battery pack. Specifically, the housing 120 of the power supply device 100 is provided with a plurality of battery pack ports 110. In some examples, the number of battery pack ports 110 is four, and in other examples, the number of battery pack ports 110 is two or more, which is not limited in the present application.

The power supply device 100 may be used for charging and/or discharging battery packs with different types. For example, the battery pack may be a lithium battery pack, a lithium-based battery pack, a solid-state battery pack, or a graphene battery pack. In some examples, the power supply device 100 can receive and charge and/or discharge battery packs with different voltages, different capacities, different structures, different shapes and different sizes. For example, the power supply device 100 can charge or discharge battery packs with rated voltages of 18V, 20V, 24V, 28V, 30V, 56V, greater than 56V, etc. Alternatively, the power supply device 100 can charge or discharge the battery pack with a rated voltage within the above voltage range. A battery device can also charge or discharge the battery pack with a battery capacity of 1.2 Ah, 1.3 Ah, 1.4 Ah, 2.0 Ah, 2.4 Ah, 2.6 Ah, or 3.0 Ah.

Referring to FIG. 2, the power supply device 100 further includes a Battery Management System (BMS) module 130, a power supply module 140, a booster circuit 150, an inverter circuit 160, a controller 170 and an alternating current interface 180 which are located in the housing 120.

The BMS module 130 is electrically connected to the battery pack port 110 and configured to achieve charging and discharging management of the battery pack. Specifically, the BMS module 130 includes a connection circuit 131. The connection circuit 131 is electrically connected to the battery pack port 110 for connecting in series or parallel the battery packs accessed to the battery pack port 110, and outputs a total voltage Vb of the battery packs connected in series or parallel. Specifically, when the battery packs access the battery pack port 110, the BMS module 130 obtains the number of accessed battery packs and a voltage of each battery pack, and the connection circuit 131 connects the accessed battery packs in series or parallel to output the total voltage Vb of the battery packs.

The booster circuit 150 is electrically connected to the connection circuit 131 and configured for increasing the total voltage of the battery packs to output a high-voltage direct current voltage, where the high-voltage direct current voltage is greater than the total voltage Vb of the battery packs. The booster circuit 150 will be specifically described below with reference to the drawings.

The inverter circuit 160 is electrically connected to the booster circuit 150 to invert the high-voltage direct current voltage output from the booster circuit 150 into an alternating current.

The alternating current interface 180 is electrically connected to the inverter circuit 160 to output the alternating current inverted by the inverter circuit 160. In this way, under the working condition requiring the use of an alternating current, the direct current total voltage Vb of the accessed battery packs is converted into an alternating current voltage through the power supply device 100 and output via the alternating current interface 180, thereby supplying power to the alternating current consumption device. In some examples, the power supply device 100 may include a plurality of alternating current interfaces 180. Specifically, the alternating current interface 180 may be a three-phase alternating current socket.

Figure 3:
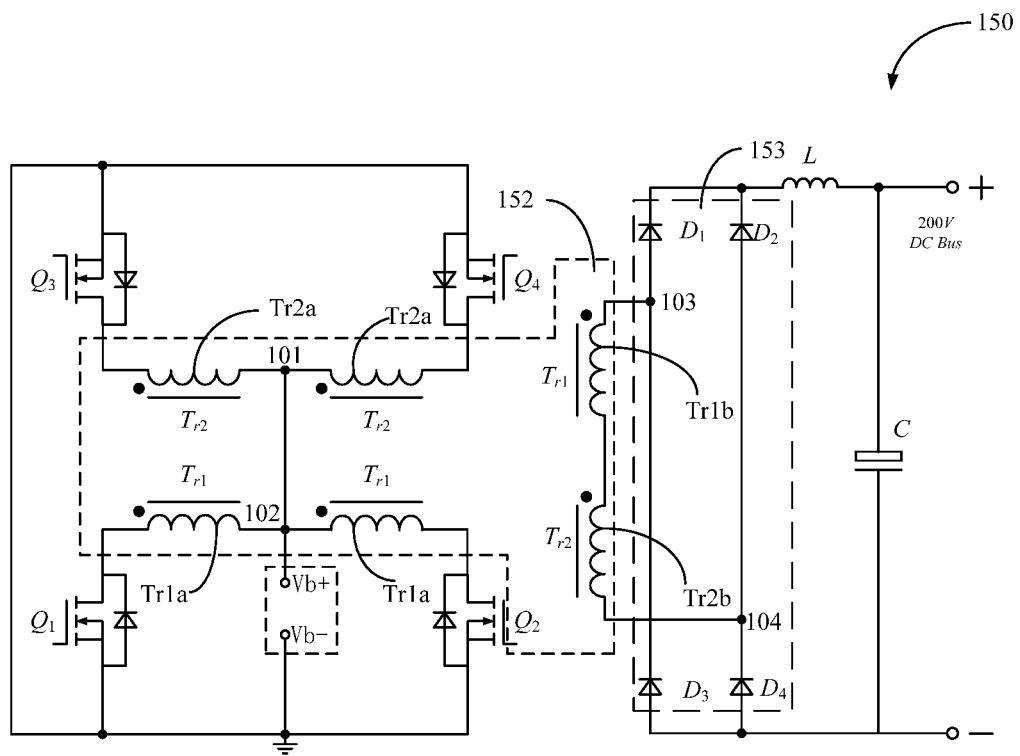
FIG. 3 is a circuit diagram of a booster circuit according to one example.

Referring to FIG. 3, the booster circuit 150 includes an access terminal 151, a transformer group 152, a rectifier bridge 153, an inductor L, and a capacitor C. The access terminal 151 is configured to access the total voltage Vb from the battery packs. The transformer group 152 includes a first transformer Tr1 and a second transformer Tr2, where the first transformer Tr1 includes a first primary side Tr1a and a first secondary side Tr1b, the second transformer Tr2 includes a second primary side Tr2a and a second secondary side Tr2b, a connection between the first primary side Tr1a and the second primary side Tr2a is one of a series connection or a parallel connection, and a connection between the first secondary side Tr1b and the second secondary side Tr2b is the other of the series connection or the parallel connection. In the example shown in FIG. 3, the first primary side Tr1a and the second primary side Tr2a are connected in parallel, and the first secondary side Tr1b and the second secondary side Tr2b are connected in series. Specifically, the first transformer Tr1 includes two series-connected first primary sides Tr1a, a first node 101 is provided between the two series-connected first primary sides Tr1a, the second transformer Tr2 includes two second primary sides Tr2a, a second node 102 electrically connected to the access terminal 151 is provided between the two series-connected second primary sides Tr2a, and the first node 101 and the second node 102 are electrically connected to connect the first primary side Tr1a and the second primary side Tr2a in parallel.

The first transformer Tr1 and the second transformer Tr2 are provided to reduce a size of the transformer group 152 and meet the demand for high power output of the power supply device 100. Specifically, a value range of the rated power of the power supply device 100 is greater than or equal to 350 W. Further, the value range of the rated power of the power supply device 100 is greater than or equal to 500 W.

For the first transformer Tr1 and the second transformer Tr2, the primary sides are connected in parallel and the secondary sides are connected in series, which can achieve the power sharing of the booster circuit 150 to protect electronic components in the booster circuit 150 and simplify a design of the transformer, and reduce the number of transformer turns and inherent leakage.

The booster circuit 150 further includes a power switch transistor electrically connected to the first primary side Tr1a or the second primary side Tr2a. Specifically, the booster circuit 150 includes a first power switch transistor Q1, a second power switch transistor Q2, a third power switch transistor Q3, and a fourth power switch transistor Q4. A source electrode of the third power switch transistor Q3 is electrically connected to the first primary side Tr1a, a drain electrode of the third power switch transistor Q3 is electrically connected to the source electrode of the first power switch transistor Q1, and a drain electrode of the first power switch transistor Q1 is electrically connected to the second primary side Tr2a; a drain electrode of the second power transistor is electrically connected to the second primary side Tr2a, and a source electrode of the second power transistor is grounded; a drain electrode of the fourth power switch transistor Q4 is electrically connected to the first primary side Tr1a, and a source electrode of the fourth power switch transistor Q4 is electrically connected to the drain electrode of the third power switch transistor Q3. Gate electrodes of the first power switch transistor Q1, the second power switch transistor Q2, the third power switch transistor Q3, and the fourth power switch transistor Q4 are all electrically connected to the controller 170. The controller 170 is configured to control at a certain frequency the power switch transistor to be turned on or off so that the first primary side Tr1a and the second primary side Tr2a oscillate to generate a primary pulse voltage.

The rectifier bridge 153 is electrically connected to the transformer group 152 to generate the high-voltage direct current by rectifying the pulse boosted to a predetermined voltage by the transformer group 152. In some examples, the rectifier bridge 153 includes four diodes. The first secondary side Tr1b is electrically connected to a third node 103 between a first diode D1 and a third diode D3, and the second secondary side Tr2b is electrically connected to a fourth node 104 between a second diode D2 and a fourth diode D4.

One end of the inductor L is electrically connected to a cathode of the second diode D2, the other end of the inductor L is electrically connected to one end of the capacitor C, and the other end of the capacitor C is electrically connected to an anode of the fourth diode D4.

A working mode diagram of the power switch under the control of the controller 170 will be specifically described below with reference to FIGS. 4 to 8.

Figure 4:
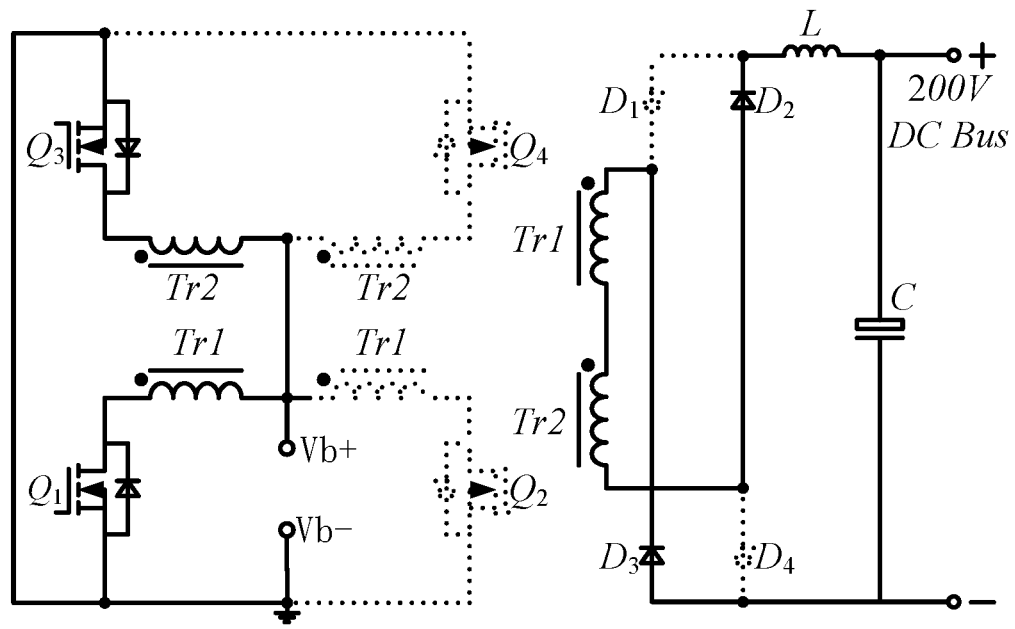
FIG. 4 is a circuit diagram of the booster circuit of FIG. 3 in a mode.
Figure 8:
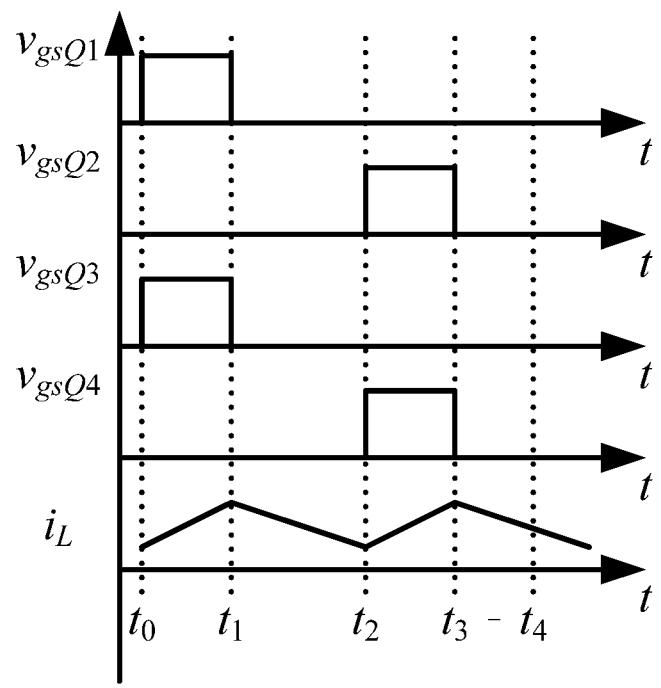
FIG. 8 is a graph showing a relationship between a driving state of a power switch transistor and an inductor current of the boost circuit of FIG. 3.

Referring to FIG. 4, the controller 170 first outputs a first control signal that enables the first power switch transistor Q1 and the third power switch transistor Q3 to be turned on, and at this time, the second power switch transistor Q2 and the fourth power switch transistor Q4 are turned off. A current from the battery pack accessed to the access terminal 151 passes through the first node 101, the first primary side Tr1a, and the third power switch transistor Q3 in sequence to return to a negative terminal of the battery pack to form a first closed loop. A current from the battery pack accessed to the access terminal 151 passes through the second node 102, the second primary side Tr2a and the first power switch transistor Q1 in sequence to return to the negative terminal to form a second closed loop. The first secondary side Tr1b and the second secondary side Tr2b sense currents of the first primary side Tr1a and the second primary side Tr2a, and a current flowing through the third node 103 passes through the first secondary side Tr1b, the second secondary side Tr2b, the second diode D2, the inductor L, the capacitor C and the third diode D3 in sequence to return to the third node 103 to form a closed loop. Referring to FIG. 8, in this state, an average current flowing through the inductor L gradually increases.

Figure 5:
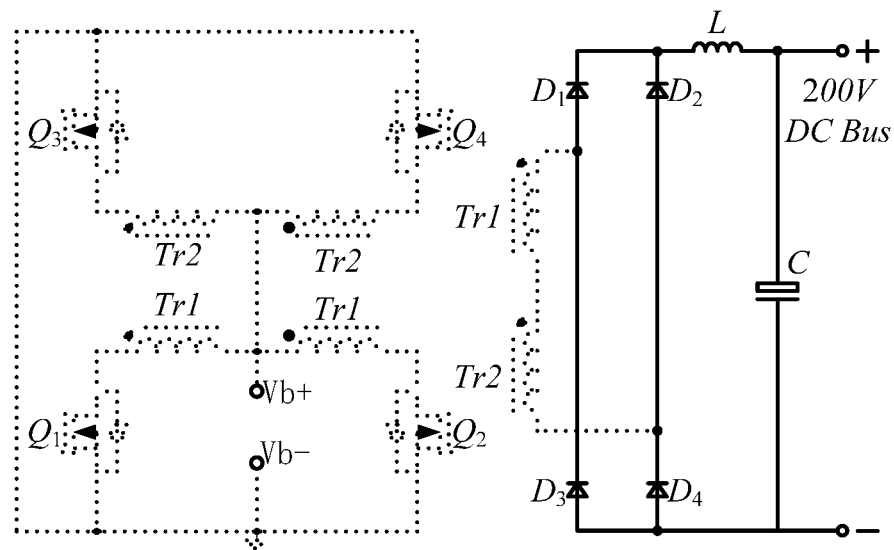
FIG. 5 is a circuit diagram of the booster circuit of FIG. 3 in another mode.

Referring to FIG. 5, the controller 170 outputs a second control signal that enables the first power switch transistor Q1 and the third power switch transistor Q3 to be turned off, and at this time, the four power switch transistors are all in the off state, and the capacitor C is discharged, so that a current of the inductor L gradually decreases (referring to FIG. 8), thereby preventing the current of the inductor L from rising all the time and protecting the inductor L.

Figure 6:
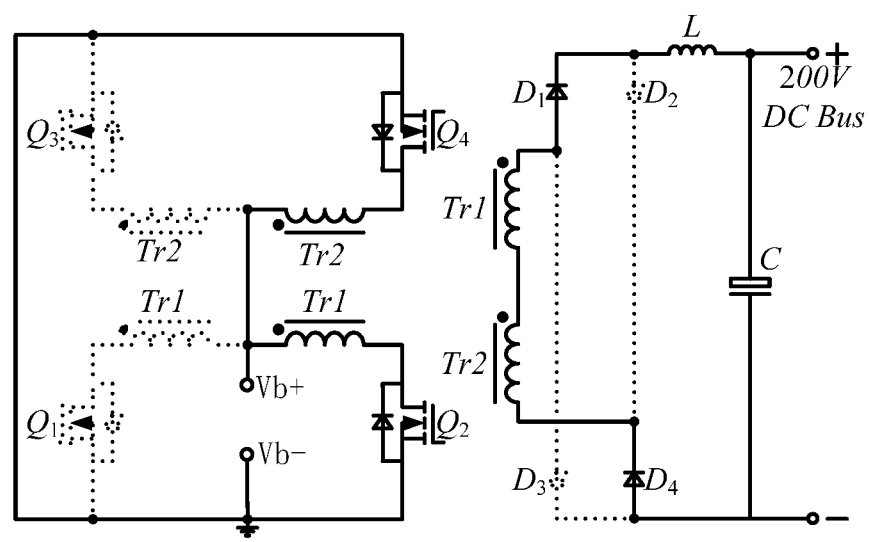
FIG. 6 is a circuit diagram of the booster circuit of FIG. 3 in another mode.

Referring to FIG. 6, the controller 170 outputs a third control signal that enables the fourth power switch and the second power switch transistor Q2 to be turned on, and at this time, both the third switch transistor and the first switch transistor are turned off. A current from the battery pack accessed to the access terminal 151 passes through the first node 101, the first primary side Tr1a, and the second power switch transistor Q2 in sequence to return to the negative terminal of the battery pack to form a third closed loop. A current from the battery pack accessed to the access terminal 151 passes through the second node 102, the second primary side Tr2a, and the fourth power switch transistor Q4 in sequence to return to the negative terminal of the battery pack to form a fourth closed loop. The first secondary side Tr1b and the second secondary side Tr2b sense currents of the first primary side Tr1a and the second primary side Tr2a, and a current flowing through the third node 103 passes through the first diode D1, the inductor L, the capacitor C, the fourth diode D4, the second secondary side Tr2b and the first secondary side Tr1b to return to the third node 103 to form a closed loop. Referring to FIG. 8, in this state, an average current flowing through the inductor L gradually increases.

Figure 7:
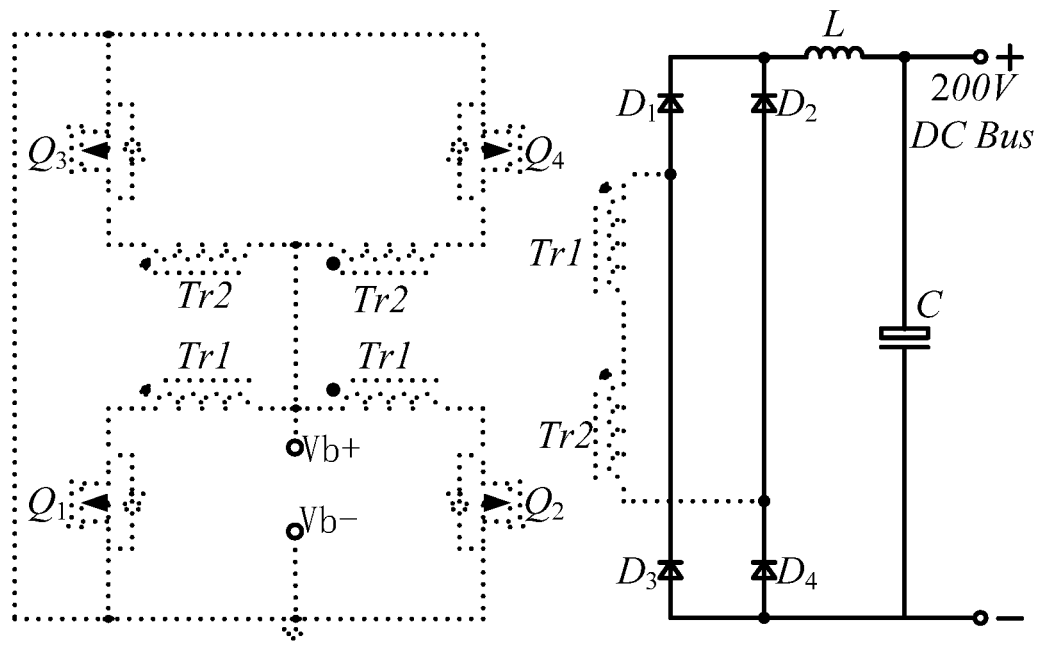
FIG. 7 is a circuit diagram of the booster circuit of FIG. 3 in another mode.

Referring to FIG. 7, the controller 170 outputs a fourth control signal that enables the fourth power switch transistor Q4 and the second power switch transistor Q2 to be turned off, and at this time, the four power switch transistors are all in the off state, and the capacitor C is discharged, so that the current of the inductor L gradually decreases (referring to FIG. 8), thereby preventing the current of the inductor L from rising all the time and protecting the inductor L.

Reference is made to state graphs of various power switch transistors over time shown in FIG. 8. The controller 170 is configured to control at a certain frequency each power switch transistor to be turned on or off in an order shown in FIG. 8. Furthermore, the total voltage accessed to the battery pack is converted into a primary pulse voltage through oscillations of the first primary side Tr1a and the second primary side Tr2a, and the primary pulse voltage is boosted to a predetermined voltage through the first secondary side Tr1b and the second secondary side Tr2b. The predetermined voltage is then converted to a high-voltage direct current voltage through pulse rectifications of the rectifier bridge 153, the inductor L and the capacitor C. It should be noted that the high-voltage direct current voltage is greater than the total voltage Vb of the battery pack.

Figure 9:
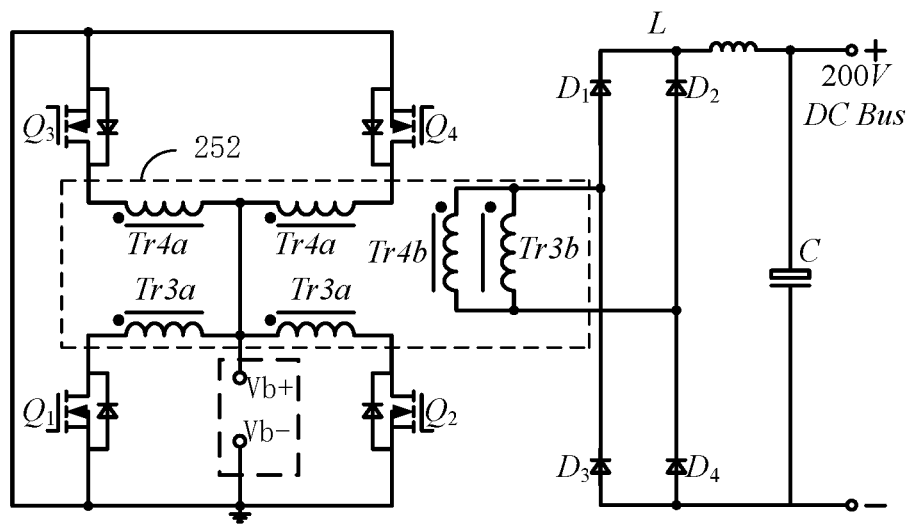
FIG. 9 is a circuit diagram of a booster circuit according to another example, in which a first primary side and a second primary side are connected in parallel, and a first secondary side and a second secondary side are connected in parallel.

Reference is made to a circuit diagram of another booster circuit shown in FIG. 9, which differs from the booster circuit 150 shown in FIG. 3 in that in the transformer group 252, the first primary side Tr3a and the second primary side Tr4a are connected in parallel, and that the first secondary side Tr3b and the second secondary side Tr4b are connected in parallel. The booster circuit can also satisfy the requirements of the high-power power supply device 100.

Figure 10:
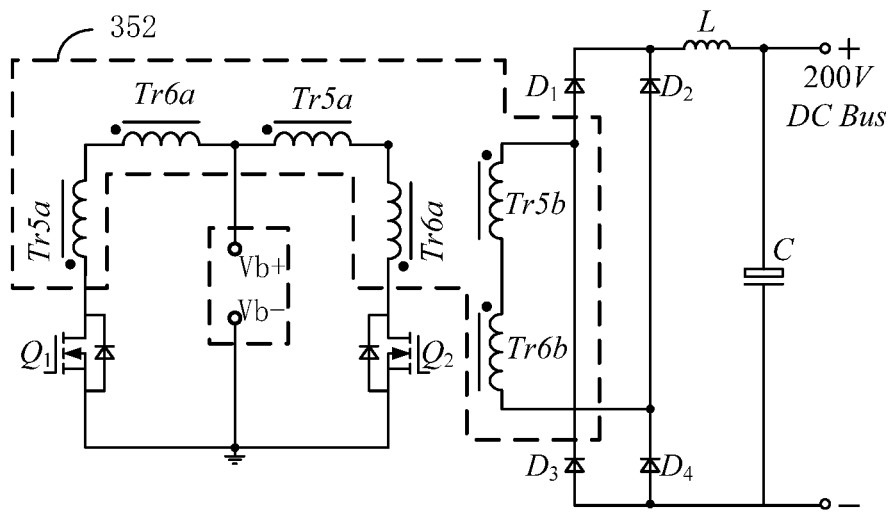
FIG. 10 is a circuit diagram of a booster circuit according to another example, in which a first primary side and a second primary side are connected in series, and a first secondary side and a second secondary side are connected in series.

Reference is made to a circuit diagram of another booster circuit shown in FIG. 10, which differs from the booster circuits shown in FIGS. 3 and 9 in that in the transformer group 352, the first primary side Tr5a and the second primary side Tr6a are connected in series, and that the first secondary side Tr5b and the second secondary side Tr6b are connected in series. The booster circuit can also satisfy the requirements of the high-power power supply device 100.

Figure 11:
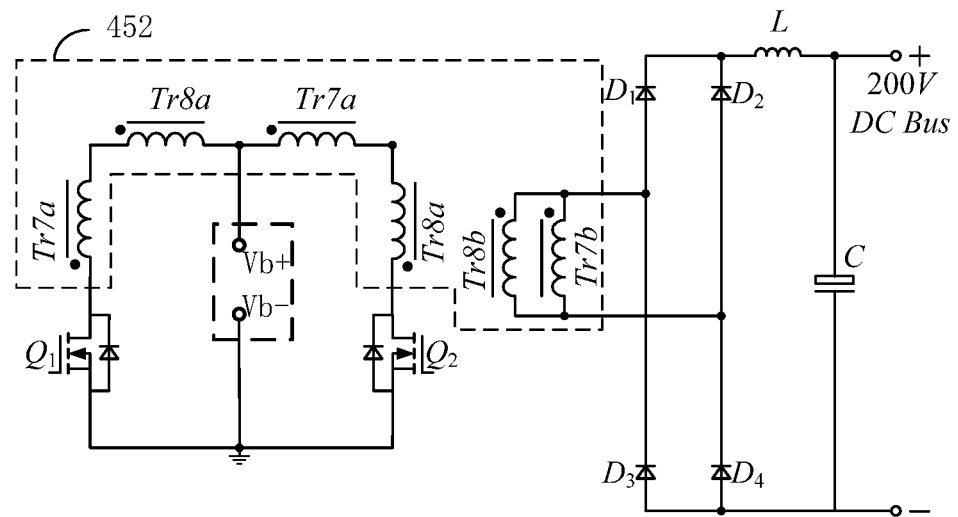
FIG. 11 is a circuit diagram of a booster circuit according to another example, in which a first primary side and a second primary side are connected in series, and a first secondary side and a second secondary side are connected in parallel.

Reference is made to a circuit diagram of another booster circuit shown in FIG. 11, which differs from the aforementioned booster circuits in that in the transformer group 452, the first primary side Tr7a and the second primary side Tr8a are connected in series, and that the first secondary side Tr7b and the second secondary side Tr8b are connected in parallel. The power switch transistor is adjusted adaptively according to the connection relationship between the primary side and the secondary side. The booster circuit can also satisfy the requirements of the high-power power supply device 100. The specific circuit principle is basically the same as the specific circuit principle of the booster circuit 150 shown in FIG. 3, and details are not repeated here.

Figure 12:
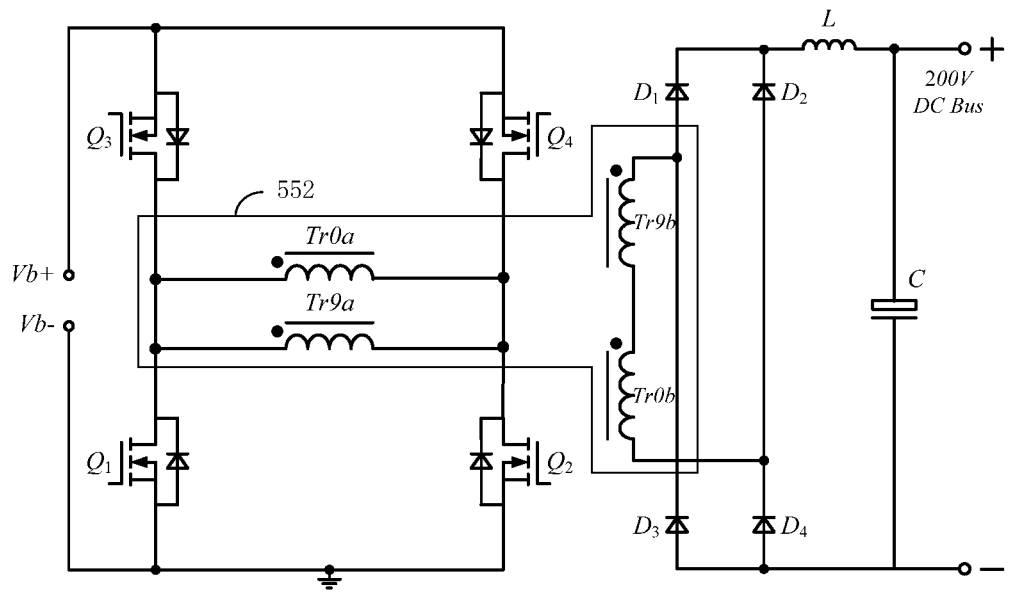
FIG. 12 is a circuit diagram of a booster circuit according to another example, the booster circuit including merely one first primary side and one second primary side.

Reference is made to the circuit diagram of another booster circuit 150 shown in FIG. 12, which differs from the booster circuit 150 shown in FIG. 3 in that the transformer group 552 includes merely one first primary side Tr9a and one second primary side Tr0a. The booster circuit can also satisfy the requirements of the high-power power supply device 100. The specific circuit principle is basically the same as the specific circuit principle of the booster circuit 150 shown in FIG. 3, and details are not repeated here.

Figure 13:
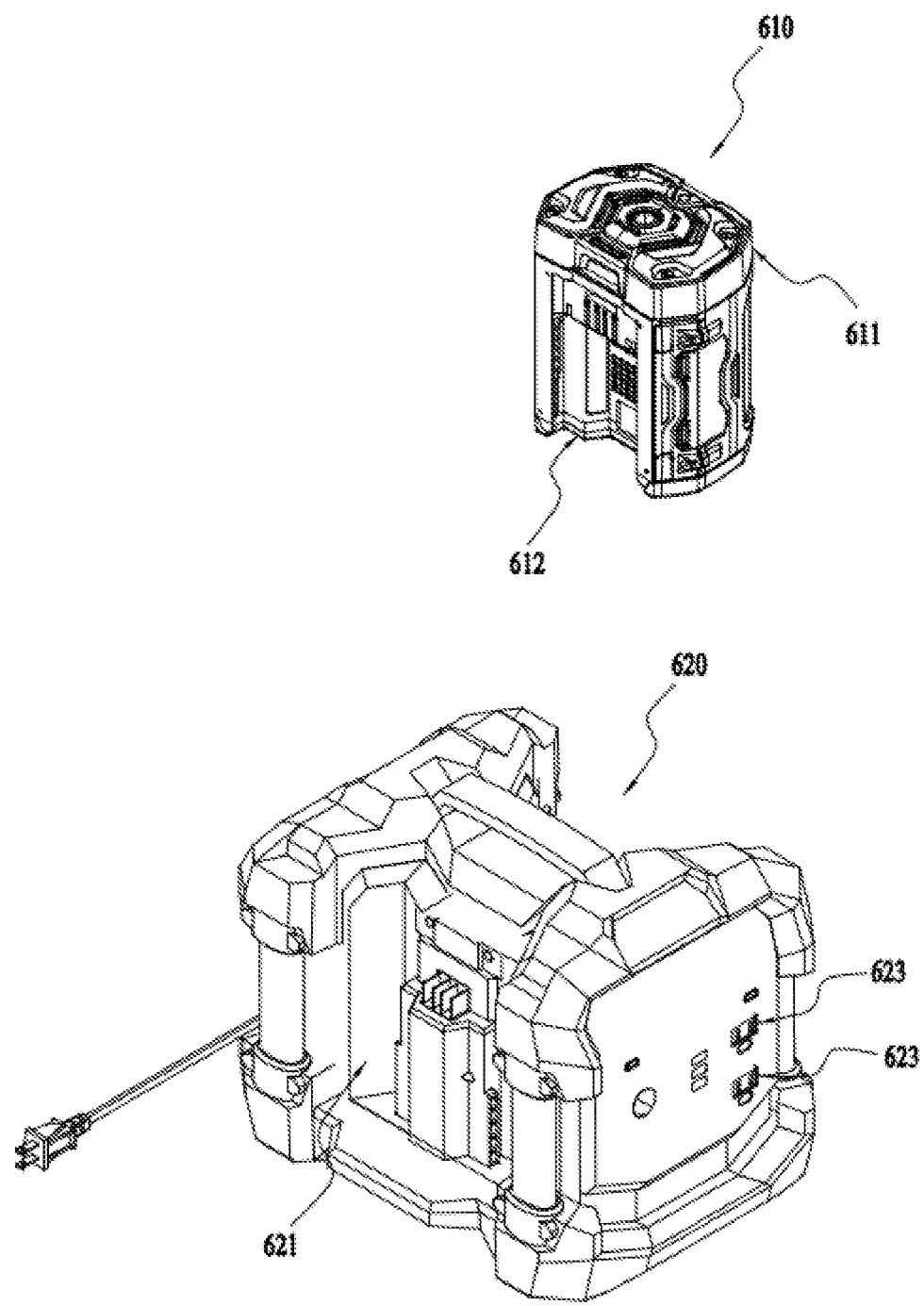
FIG. 13 is a structural view of a power supply device according to an example.
Figure 14:
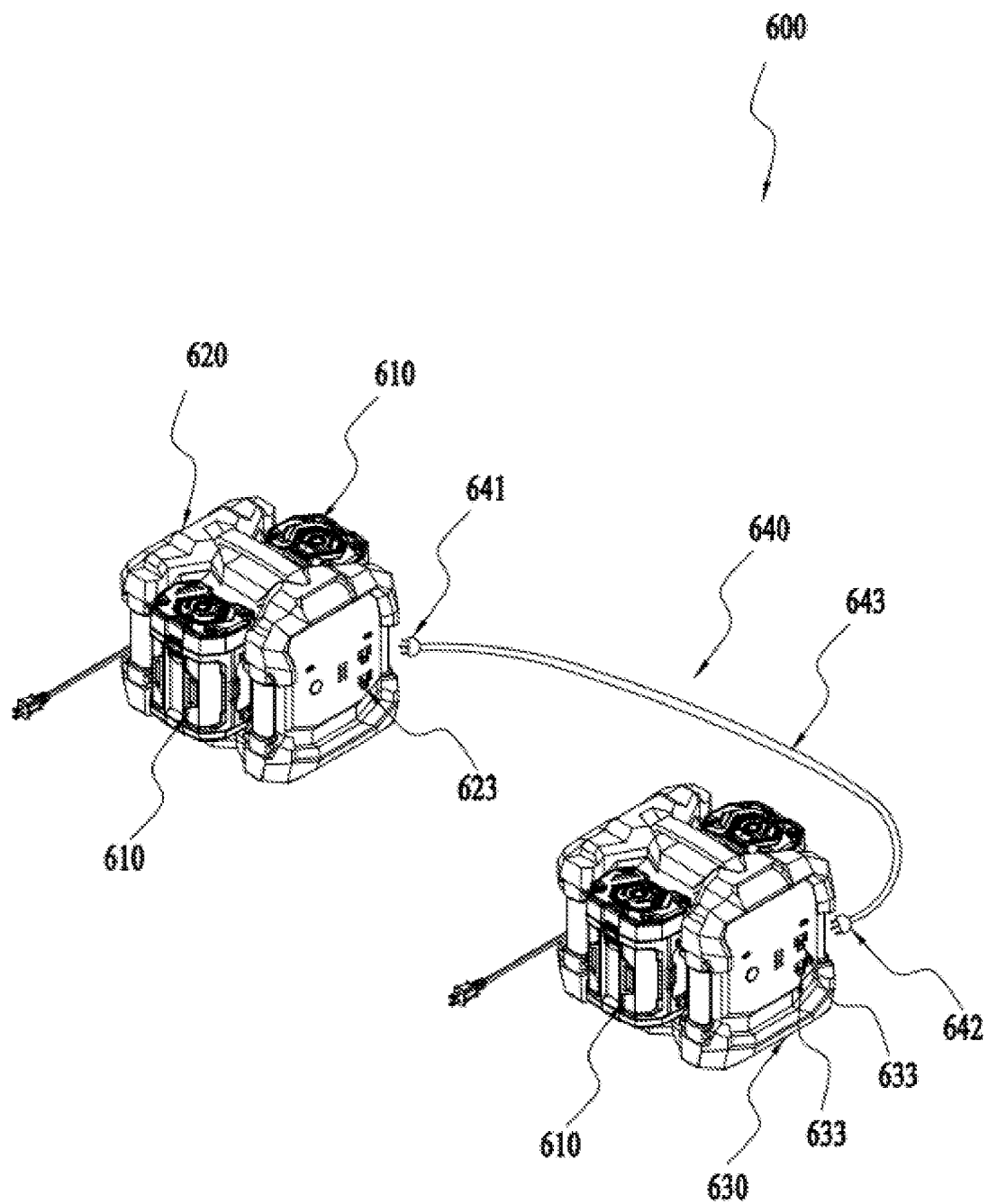
FIG. 14 is a structural view of a portable electrical energy system according to an example.

A portable electrical energy system 100 shown in FIGS. 13 and 14 includes a battery pack 610, a first power supply device 620, a second power supply device 630, and an alternating current connection device 640.

The battery pack 610 can power at least one power tool. For example, the battery pack 610 can provide a source of electrical energy for a lawnmower or a hair dryer. Specifically, the battery pack 610 includes a battery cell and a battery pack housing 611, and the battery cell is accommodated in the battery pack housing 611. The battery cell is configured for storing electrical energy, and the battery cell can be repeatedly charged and discharged. A lithium ion battery can be selected as the battery cell. The battery pack housing 611 includes a coupling portion 612, and the battery pack 610 can be coupled to the power tool through the coupling portion 612.

Figure 15:
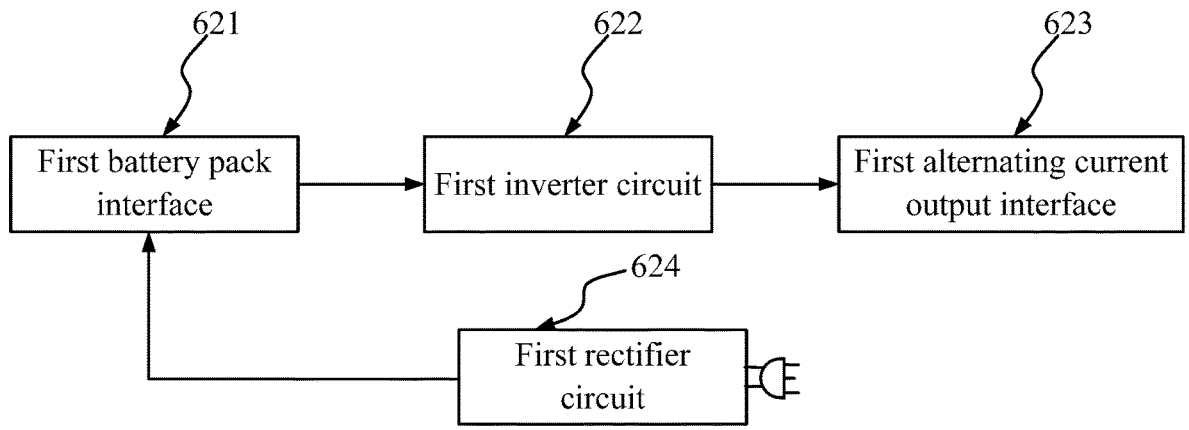
FIG. 15 is a partial circuit block diagram of a first power supply device of FIG. 14.

Referring to FIGS. 14 and 15, the first power supply device 620 is configured for outputting electrical energy from the battery pack 610 or inputting electrical energy to the battery pack 610. The first power supply device 620 includes a first battery pack interface 621, a first inverter circuit 622 and a first alternating current output interface 623.

The first battery pack interface 621 is configured for accessing the battery pack 610 so that the battery pack 610 can be detachably connected to the first power supply device 620. In some examples, the first power supply device 620 includes a plurality of battery pack 610 interfaces, which can access a plurality of battery packs 610.

The first inverter circuit 622 is electrically connected to the first battery pack interface 621, and is configured for converting a direct current input from the battery pack 610 into a first alternating current for output.

The first alternating current output interface 623 is electrically connected to the first inverter circuit 622, and is configured for outputting a first alternating current inverted by the first inverter circuit 622. In some examples, the first power supply device 620 includes a plurality of first alternating current output interfaces 623. Specifically, the first power supply device 620 includes at least two first alternating current output interfaces 623. An external device using the alternating current accesses the first alternating current output interface 623, and the first power supply device 620 converts a direct current voltage of the accessed battery pack 610 through the first inverter circuit 622 into an alternating current voltage for output to supply power to the accessed device using the alternating current.

The first power supply device 620 further includes a first rectifier circuit 624 configured to convert an alternating current accessed to the first power supply device 620 into a direct current to charge the accessed battery pack 610. The first rectifier circuit 624 is electrically connected to the first battery pack interface 621.

Figure 16:
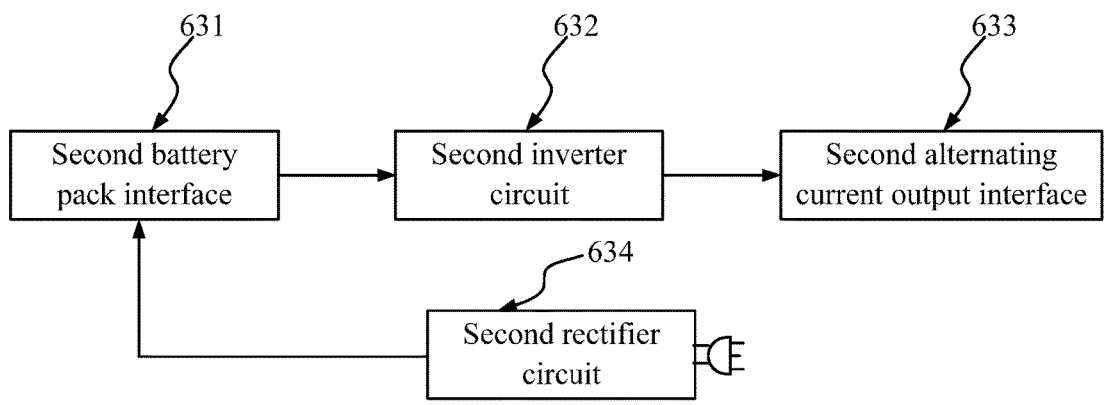
FIG. 16 is a partial circuit block diagram of a second power supply device of FIG. 14.

Referring to FIGS. 14 and 16, the second power supply device 630 is configured for outputting electrical energy from the battery pack 610 or inputting electrical energy to the battery pack 610. The second power supply device 630 includes a second battery pack interface 631, a second inverter circuit 632, and a second alternating current output interface 633.

The second battery pack interface 631 is configured for accessing the battery pack 610 so that the battery pack 610 can be detachably connected to the second power supply device 630. In some examples, the second power supply device 630 includes a plurality of battery pack interfaces 631 that can access a plurality of battery packs 610.

The second inverter circuit 632 is electrically connected to the second battery pack interface 631, and is configured for converting a direct current input from the battery pack 610 into a second alternating current for output.

The second alternating current output interface 633 is electrically connected to the second inverter circuit 632, and is configured for outputting an alternating current inverted by the second inverter circuit 632. In some examples, the second power supply device 630 includes a plurality of second alternating current output interfaces 633. Specifically, the second power supply device 630 includes at least two second alternating current output interfaces 633. The external device using the alternating current accesses the second alternating current output interface 633, and the second power supply device 630 converts a direct current voltage of the accessed battery pack 610 through the second inverter circuit 632 into an alternating current voltage for output to supply power to the accessed device using the alternating current.

The second power supply device 630 further includes a second rectifier circuit 634 configured to convert an alternating current accessed to the second power supply device 630 into a direct current to charge the accessed battery pack 610. The second rectifier circuit 634 is electrically connected to the second battery pack interface 631.

It should be noted that the second power supply device 630 may be a power supply device having the same structure as the first power supply device 620, or may be a power supply device having a different structure from the first power supply device 620, and the first power supply device 620 and the second power supply device 630 merely need to be able to convert the direct current accessed to the battery pack 610 into the alternating current for output via the alternating current interface.

The alternating current connection device 640 is configured for connecting the first alternating current output interface 623 and the second alternating current output interface 633 so that a first alternating current voltage and a second alternating current voltage are connected in parallel to output a parallel voltage of the two alternating current voltages. In this way, in a condition that a high-power electrical device needs to be powered and that one power supply device is not enough to provide sufficient power, the alternating current output interfaces of two power supply devices can be connected in parallel through the alternating current connection device 640 to output the parallel voltage and thus provide a higher power.

Referring to FIG. 14, in some examples, the alternating current connection device 640 includes a first alternating current connection terminal 641, a second alternating current connection terminal 642, and an alternating current connection cable which is electrically connected to the first alternating current connection terminal 641 and the second alternating current connection terminal 642, separately. The first alternating current connection terminal 641 is electrically connected to the first alternating current output interface 623, and the second alternating current connection terminal 642 is electrically connected to the second alternating current output interface 633. Specifically, both the first alternating current connection terminal 641 and the second alternating current connection terminal 642 are three-phase plugs, and both the first alternating current output interface 623 and the second alternating current output interface 633 are three-phase sockets. The first alternating current connection terminal 641 accesses the first alternating current output interface 623 and the second alternating current connection terminal 642 accesses the second alternating current output interface 633 to achieve a parallel connection of the first alternating current voltage and the second alternating current voltage. More specifically, the first alternating current output interface 623 among the first alternating current output interfaces 623 that does not access the first alternating current connection terminal 641 outputs the parallel voltage in which the first alternating current voltage and the second alternating current voltage are connected in parallel. Alternatively, the second alternating current output interface 633 among the second alternating current output interfaces 633 that does not access the second alternating current connection terminal 642 outputs the parallel voltage in which the first altering current voltage and the second alternating current voltage are connected in parallel to power the high-power electrical device.

A power range of the high-power electric device is greater than or equal to 500 W, and further, greater than or equal to 1000 W.

The alternating current connection cable does not include an interconnection cable.

Figure 17:
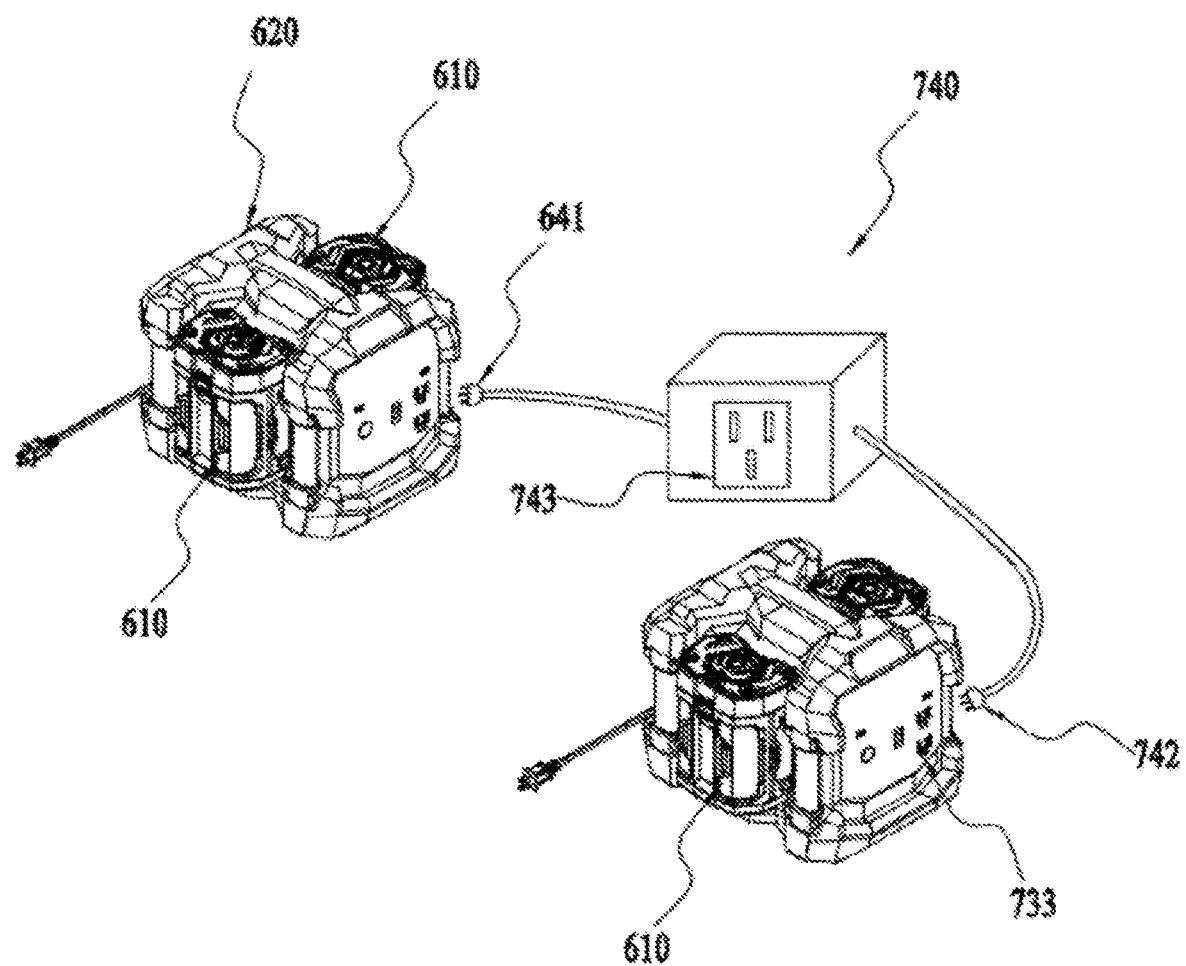
FIG. 17 is a structural view of a portable electrical energy system according to another example.

Referring to FIG. 17, in other examples, an alternating current connection device 740 includes a first alternating current connection terminal 741, a second alternating current connection terminal 742, and an alternating current output terminal 743. The first alternating current connection terminal 741 is electrically connected to the first alternating current output interface 623, the second alternating current connection terminal 742 is electrically connected to the second alternating current output interface 633, and the alternating current output terminal outputs the parallel voltage in which the first alternating current and the second of alternating current are connected in parallel.

In some other examples, the first alternating current output interface 623 and the second alternating current output interface 633 may be directly connected to obtain the parallel voltage in which the first alternating current and the second alternating current are connected in parallel and output the parallel voltage through another first alternating current output interface 623 or another second alternating current output interface 633.

The basic principles, main features and advantages of the present disclosure have been shown and described above. Those skilled in the art should understand that the above examples do not limit the present disclosure in any form, and that any technical solution obtained by means of equivalent substitution or equivalent transformation falls within the protection scope of the present disclosure.

INDUSTRIAL APPLICABILITY

The present disclosure provides a power supply device which can output an alternating current and which is compact in structure and convenient to carry.

What is claimed is:

1. A power supply device, comprising:
a housing;
a plurality of battery pack ports, which are disposed on the housing to access a plurality of battery packs;
a booster circuit, which is electrically connected to the plurality of battery pack ports to increase voltages of the plurality of battery packs to output a high-voltage direct current voltage; and
an inverter circuit, which is electrically connected to the booster circuit to invert the high-voltage direct current voltage output by the booster circuit into an alternating current;
wherein the booster circuit comprises:
a first transformer, comprising a first primary side and a first secondary side; and
a second transformer, comprising a second primary side and a second secondary side; wherein
a connection between the first primary side and the second primary side is one of a series connection or a parallel connection, and a connection between the first secondary side and the second secondary side is another one of the series connection or the parallel connection.

2. The power supply device according to claim 1, wherein the first primary side and the second primary side are connected in parallel and the first secondary side and the second secondary side are connected in series.

3. The power supply device according to claim 1, wherein the booster circuit further comprises a power switch transistor which is electrically connected to the first primary side or the second primary side to turn on one of the first primary side or the second primary side.

4. The power supply device according to claim 3, further comprising a controller which is electrically connected to the power switch transistor and configured to control at a certain frequency the power switch transistor to be turned on or off so that the first primary side and the second primary side oscillate to generate a primary pulse voltage.

5. The power supply device according to claim 1, wherein the booster circuit further comprises a rectifier bridge which is electrically connected to the first secondary side and the second secondary side separately so that the booster circuit outputs a first direct current voltage.

6. The power supply device according to claim 1, wherein a value range of rated power of the power supply device is greater than or equal to 350 W.

7. A booster circuit for a power supply device, comprising:
an access terminal, which is configured to access a direct current voltage from a battery pack;
a transformer group, which is electrically connected to the access terminal so that the accessed direct current voltage is boosted to a predetermined voltage by the transformer group; and
a rectifier bridge, which is electrically connected to the transformer group to convert the predetermined voltage into a high-voltage direct current after pulse rectification;
wherein the transformer group comprises:
a first transformer, comprising a first primary side and a first secondary side; and
a second transformer, comprising a second primary side and a second secondary side;
wherein a connection between the first primary side and the second primary side is one of a series connection or a parallel connection, and a connection between the first secondary side and the second secondary side is another one of the series connection or the parallel connection.

8. The booster circuit according to claim 7, wherein the first primary side and the second primary side are connected in parallel and the first secondary side and the second secondary side are connected in series.

9. The booster circuit according to claim 7, further comprising a power switch transistor which is electrically connected to the first primary side or the second primary side to turn on one of the first primary side or the second primary side.

10. The booster circuit according to claim 7, further comprising a power switch transistor which is electrically connected to the first primary side or the second primary side, and a controller which is electrically connected to the power switch transistor and configured to control at a certain frequency the power switch transistor to be turned on or off so that the first primary side and the second primary side oscillate to generate a primary pulse voltage.

11. A portable electrical energy system, comprising:
a battery pack, which is capable of powering at least one power tool;
a first power supply device, which is configured for outputting electrical energy from the battery pack or inputting electrical energy to the battery pack; and
a second power supply device, which is configured for outputting electrical energy from the battery pack or inputting electrical energy to the battery pack;
wherein the first power supply device comprises:
a first inverter circuit, which is configured to convert a direct current input by the battery pack to an alternating current; and
a first alternating current output interface, which is configured to enable the first power supply device to output a first alternating current voltage, and electrically connected to the first inverter circuit;
wherein the second power supply device comprises:
a second inverter circuit, which is configured to convert a direct current input by the battery pack to an alternating current; and
a second alternating current output interface, which is configured to enable the second power supply device to output a second alternating current voltage, and electrically connected to the second inverter circuit; and
an alternating current connection device, which is configured for connecting the first alternating current output interface and the second alternating current output interface, so that the first alternating current voltage and the second alternating current voltage are connected in parallel.

12. The portable electrical energy system according to claim 11, wherein the first power supply device comprises a plurality of first alternating current output interfaces.

13. The portable electrical energy system according to claim 11, wherein the second power supply device comprises a plurality of second alternating current output interfaces.

14. The portable electrical energy system according to claim 11, wherein the alternating current connection device comprises a first alternating current connection terminal which is electrically connected to the first alternating current output interface and a second alternating current connection terminal which is electrically connected to the second alternating current output interface.

15. The portable electrical energy system according to claim 14, wherein the alternating current connection device comprises an alternating current output terminal, which is configured to output a total voltage in which the first alternating current voltage and the second alternating current voltage are connected in parallel.

16. The portable electrical energy system according to claim 11, wherein the alternating current connection device comprises the first alternating current connection terminal which is electrically connected to the first alternating current output interface, the second alternating current connection terminal which is electrically connected to the second alternating current output interface, and an alternating current connection cable which is electrically connected to the first alternating current connection terminal and the second alternating current connection terminal, separately, wherein the alternating current connection cable does not comprise an interconnection cable.

17. The portable electrical energy system according to claim 14, wherein the first power supply device comprises at least two first alternating current output interfaces, one of the two first alternating current output interfaces is electrically connected to the alternating current connection device, and another one of the two first alternating current output interfaces is configured for outputting a parallel voltage in which the first alternating current voltage and the second alternating current voltage are connected in parallel.

18. The portable electrical energy system according to claim 14, wherein the second power supply device comprises at least two second alternating current output interfaces, one of the two second alternating current output interfaces is electrically connected to the alternating current connection device, and another one of the two second alternating current output interfaces is configured for outputting a parallel voltage in which the first alternating current voltage and the second alternating current voltage are connected in parallel.

19. The portable electrical energy system according to claim 11, wherein the first power supply device further comprises a first battery pack interface which is configured for the battery pack to be detachably connected to the first power supply device.

20. The portable electrical energy system according to claim 11, wherein the second power supply device further comprises a second battery pack interface which is configured for the battery pack to be detachably connected to the second power supply device.

* * * * *